(12) United States Patent
Inoe et al.

(10) Patent No.: US 11,170,490 B2
(45) Date of Patent: Nov. 9, 2021

(54) PLACEMENT DETECTION SYSTEM

(71) Applicant: Panasonic Intellectual Property Management Co., Ltd., Osaka (JP)

(72) Inventors: Masanobu Inoe, Osaka (JP); Yuki Kobayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 37 days.

(21) Appl. No.: 16/812,889

(22) Filed: Mar. 9, 2020

(65) Prior Publication Data
US 2020/0211173 A1 Jul. 2, 2020

Related U.S. Application Data

(63) Continuation of application No. PCT/JP2018/026975, filed on Jul. 18, 2018.

(30) Foreign Application Priority Data

Sep. 29, 2017 (JP) .............................. JP2017-189358

(51) Int. Cl.
*G06K 9/48* (2006.01)
*G06T 7/00* (2017.01)
(Continued)

(52) U.S. Cl.
CPC .......... *G06T 7/0002* (2013.01); *G06K 9/2054* (2013.01); *G06K 9/3233* (2013.01);
(Continued)

(58) Field of Classification Search
CPC ........... G06K 9/00442; G06K 9/00449; G06K 9/00463; G06K 9/2054; G06K 9/3233;
(Continued)

(56) References Cited

U.S. PATENT DOCUMENTS 5,790,262 A 8/1998 Kanno
5,805,970 A 9/1998 Kasamatsu
(Continued)

FOREIGN PATENT DOCUMENTS

EP 0 371 744 6/1990
JP 2004-274198 9/2004

OTHER PUBLICATIONS

Extended European Search Report dated Sep. 11, 2020 in related European Patent Application No. 18862443.1.
(Continued)

*Primary Examiner* — Eric Rush
(74) *Attorney, Agent, or Firm* — Wenderoth, Lind & Ponack, L.L.P.

(57) ABSTRACT

A placement detection system includes: a placement table; an imaging device that images an object placed on the placement table to generate an input image; and a control device. The control device generates a first binarized image for the input image based on a first threshold value and determines whether the object is placed in a predetermined placement orientation. The control device changes a threshold value for a target pixel to a second threshold value higher than the first threshold value when the object is determined to be placed in the predetermined placement orientation, the target pixel being sandwiched between pixels having pixel levels lower than or equal to the first threshold value and has a higher pixel level than the first threshold value in a first region, generates a second binarized image for the target pixel based on the second threshold value, and detects a shape of the object.

13 Claims, 12 Drawing Sheets

(51) Int. Cl.
*G06T 7/62* (2017.01)
*G06T 7/70* (2017.01)
*G06K 9/20* (2006.01)
*H04N 1/00* (2006.01)
*G06K 9/32* (2006.01)
*G06K 9/34* (2006.01)
*G06K 9/38* (2006.01)
*G06T 7/50* (2017.01)
*G06T 7/194* (2017.01)

(52) U.S. Cl.
CPC ............... *G06K 9/342* (2013.01); *G06K 9/38* (2013.01); *G06T 7/194* (2017.01); *G06T 7/50* (2017.01); *G06T 7/62* (2017.01); *G06T 7/70* (2017.01); *H04N 1/00721* (2013.01); *H04N 1/00748* (2013.01); *H04N 1/00769* (2013.01)

(58) Field of Classification Search
CPC ...... G06K 9/3241; G06K 9/3275; G06K 9/34; G06K 9/342; G06K 9/38; G06K 9/4604; G06K 9/4647; G06K 2209/501; G06T 7/0002; G06T 7/10; G06T 7/11; G06T 7/12; G06T 7/13; G06T 7/136; G06T 7/187; G06T 7/194; G06T 7/50; G06T 7/62; G06T 7/70; G06T 2207/30176; H04N 1/00681; H04N 1/00689; H04N 1/00702; H04N 1/00708; H04N 1/0071; H04N 1/00713; H04N 1/00718; H04N 1/00721; H04N 1/00737; H04N 1/00742; H04N 1/00745; H04N 1/00748; H04N 1/00753; H04N 1/00769; H04N 1/00774; H04N 1/04; H04N 1/10; H04N 1/2036; H04N 1/2038; H04N 1/38; H04N 1/387; H04N 1/3872; H04N 1/3873; H04N 1/3878; H04N 1/40012; H04N 2201/0416; H04N 2201/043; H04N 2201/0434; G03G 2215/00324; G03G 2215/00329

USPC ....... 382/100, 101, 103, 112, 135, 137, 173, 382/174, 176, 199, 282, 286, 289, 291; 358/1.5, 2.1, 2.99, 448, 449, 453, 474, 358/488, 538; 355/25, 39, 40, 47, 52, 74, 355/82; 399/182, 183, 187, 189, 361, 399/362, 370, 376; 702/150, 151, 155, 702/156

See application file for complete search history.

(56) References Cited

U.S. PATENT DOCUMENTS

| | | | | |
|---|---|---|---|---|
| 6,359,702 | B1 * | 3/2002 | Irie | H04N 1/38 358/1.9 |
| 7,426,291 | B2 * | 9/2008 | Okamura | G06K 9/38 382/137 |
| 8,121,414 | B2 * | 2/2012 | Yoshino | G06K 9/4671 382/194 |
| 8,582,888 | B2 * | 11/2013 | Tanaka | G06K 9/4604 382/182 |
| 8,712,188 | B2 * | 4/2014 | Roy | G06K 9/3208 382/290 |
| 9,077,926 | B2 * | 7/2015 | He | H04N 1/387 |
| 2004/0264805 | A1 | 12/2004 | Harada et al. | |

OTHER PUBLICATIONS

International Search Report dated Oct. 2, 2018 in corresponding International Application No. PCT/JP2018/026975.

* cited by examiner

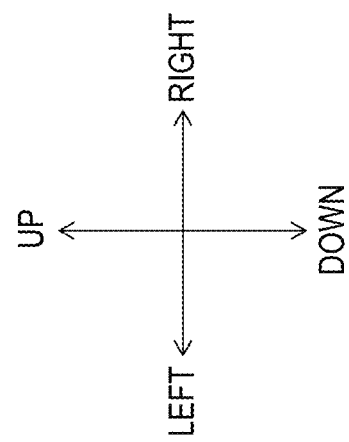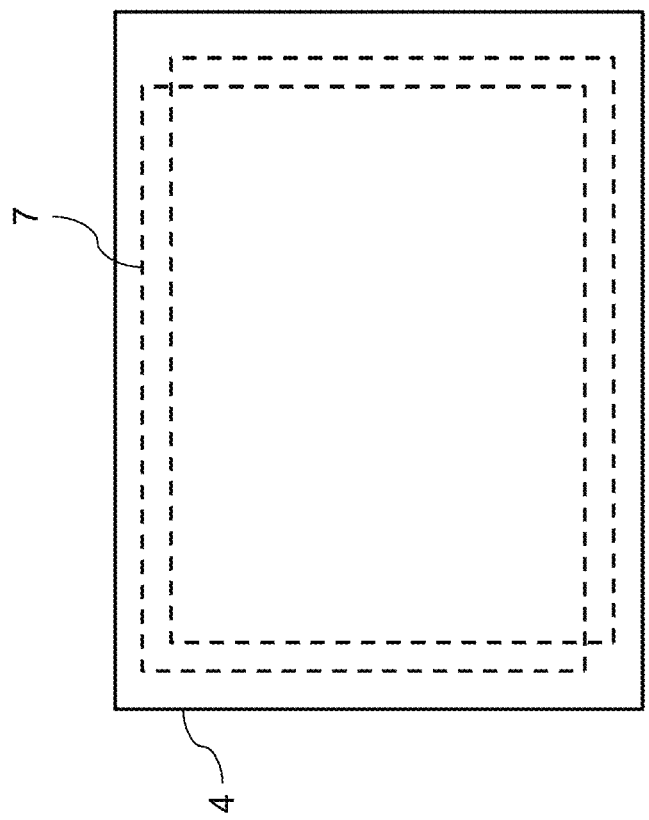
FIG. 4

FIG. 6
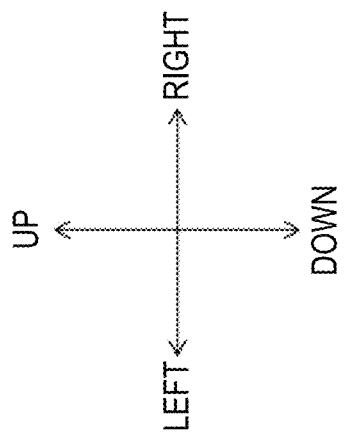
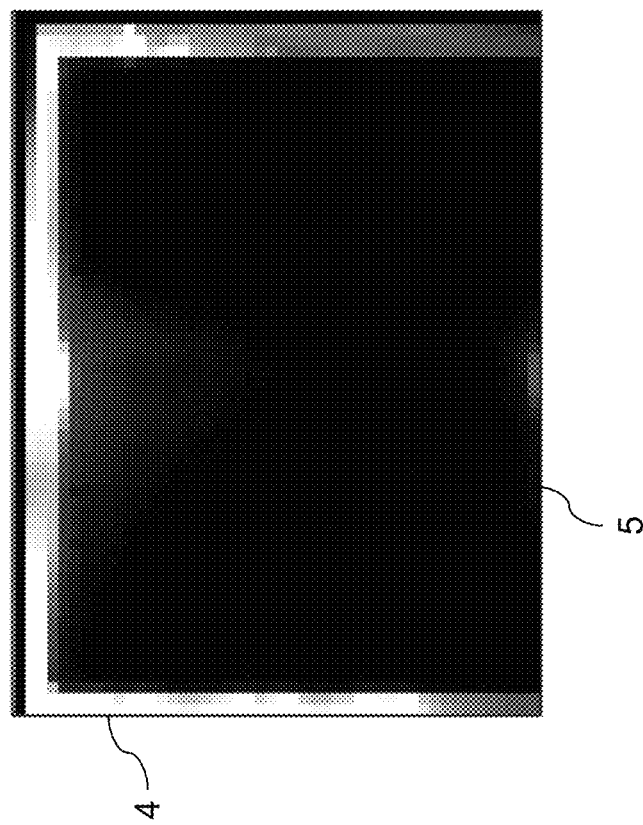

FIG. 7
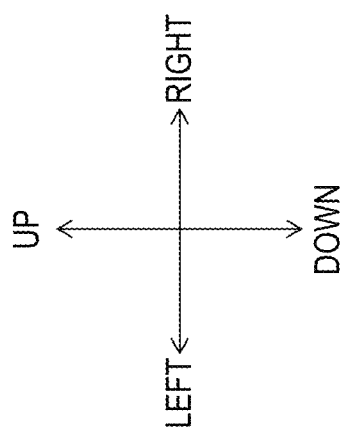
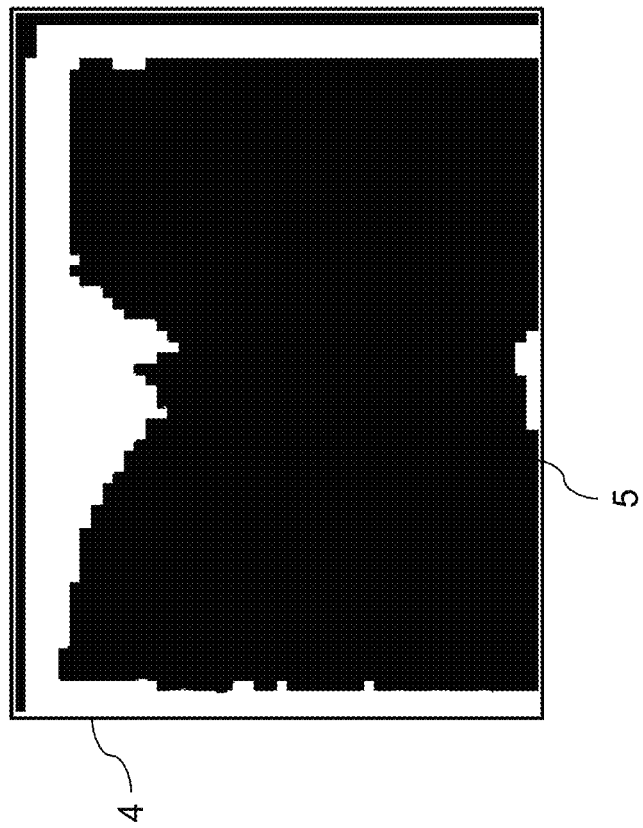

FIG. 12
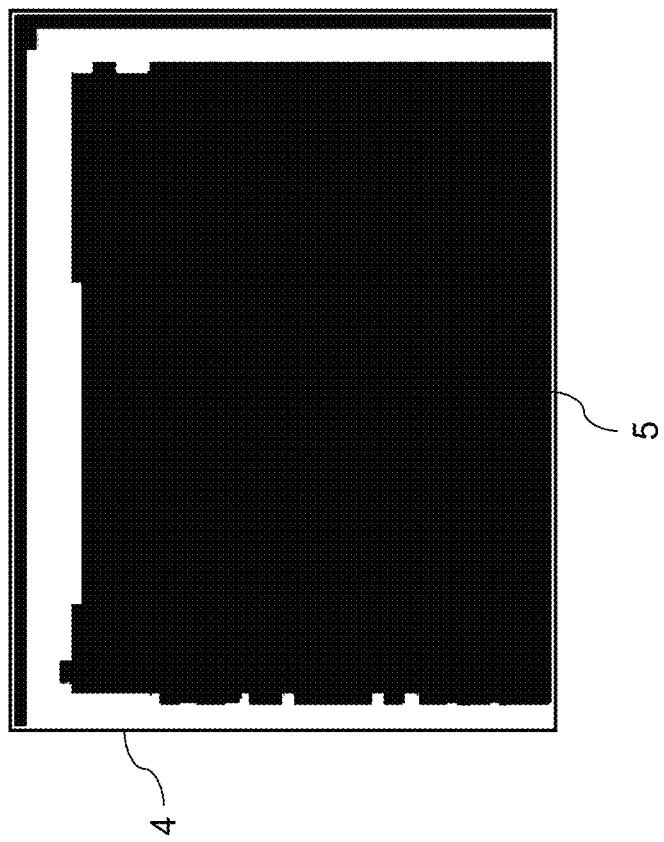
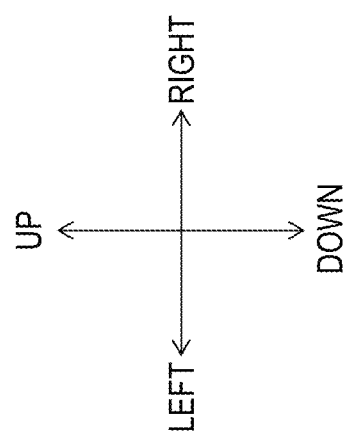

PLACEMENT DETECTION SYSTEM

BACKGROUND

1. Technical Field

The present disclosure relates to a placement detection system that binarizes an imaged image to detect a shape of a placed object.

2. Description of the Related Art

Patent literature (PTL) 1 discloses a flatbed image reading control device including an original table on which an original is placed and an original table cover for covering the original table. The image reading control device includes: a means that binarizes a read image data to extract a rectangular region including a region where the original is present; a skew detecting means that detects skew of the rectangular region; a skew correcting means that corrects the skew of the rectangle in accordance with the detected skew; a clipping width setting means that sets a clipping width on each side of the rectangle in accordance with the detected skew; and a clipping means that cuts a periphery of the rectangular region based on the set clipping width for each side to obtain an original image. This way, it is possible to improve clipping precision of an original portion.

PTL 1 is Unexamined Japanese Patent Publication No. 2004-274198.

SUMMARY

The present disclosure provides a placement detection system effective at detecting a shape of an object placed in a placement region while lightening user's operational burden such as holding down the object with a cover or the like for covering the placement region.

The placement detection system according to the present disclosure includes: a placement table; an imaging device that images an object placed in the placement region on the placement table through the placement table to generate an input image; and a control device that receives the input image. The control device performs first binarization processing for the input image based on a first threshold value to generate a first binarized image and determines whether the object is placed in a predetermined placement orientation based on the first binarized image. The control device changes a threshold value for a target pixel to a second threshold value higher than the first threshold value when the object is determined to be placed in the predetermined placement orientation, the target pixel being sandwiched between pixels having pixel levels lower than or equal to the first threshold value and has a higher pixel level than the first threshold value in a first region of the input image, performs second binarization processing for the target pixel based on the second threshold value to generate a second binarized image, and detects a shape of the object based on the second binarized image.

The placement detection system according to the present disclosure can detect the shape of the object placed in the placement region while lightening user's operational burden such as holding down the object with the cover or the like for covering the placement region.

BRIEF DESCRIPTION OF DRAWINGS

FIG. 4 is an explanatory view of an example of a method of detecting the passport that is placed in the landscape orientation.

FIG. 6 is an explanatory view of an example of an image sensor image of the passport with the binding part lifting.

FIG. 7 is an explanatory view of an example of a binarized image of the passport with the binding part lifting.

FIG. 12 is an explanatory view of an example of a binarized image after the processing for coping with the lifting of the binding part.

DETAILED DESCRIPTION

An exemplary embodiment is described in detail below with reference to the drawings as appropriate. In some cases, however, the exemplary embodiment may not be described in more detail than necessary. For example, well-known matters may not be described in detail and substantially the same structures may not be described repeatedly in some cases. This is for preventing the following description from becoming unnecessarily redundant and for making the description easily understandable to a person skilled in the art.

The accompanying drawings and the following description are provided so that the person skilled in the art can fully understand the present disclosure and are not intended to limit a subject described in the claims.

Exemplary Embodiment

Figure 1A:
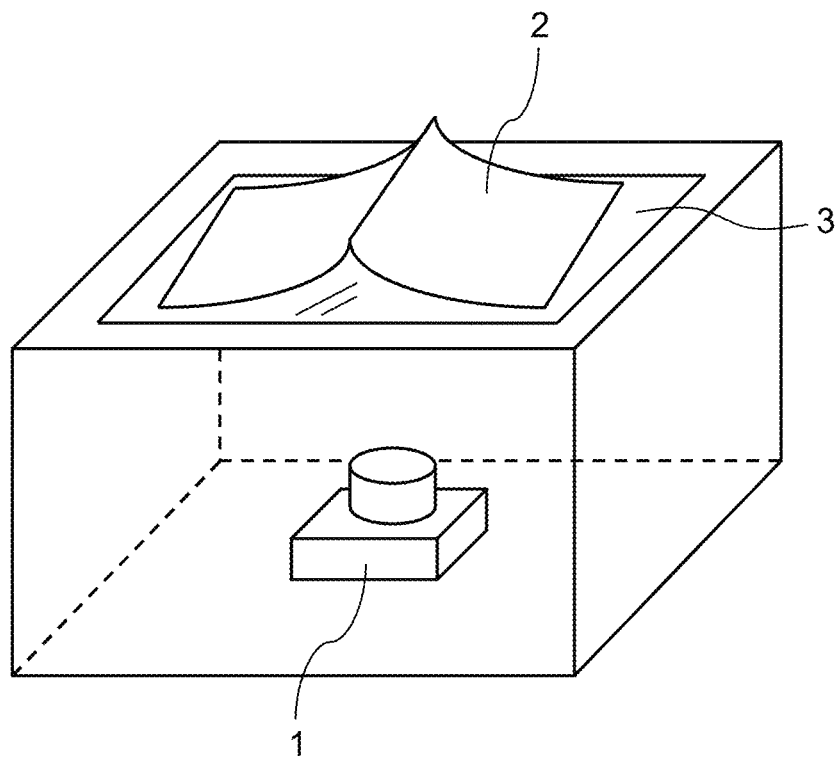
FIG. 1A is an outer appearance view of an example of a placement detection system according to the present disclosure.
Figure 1B:
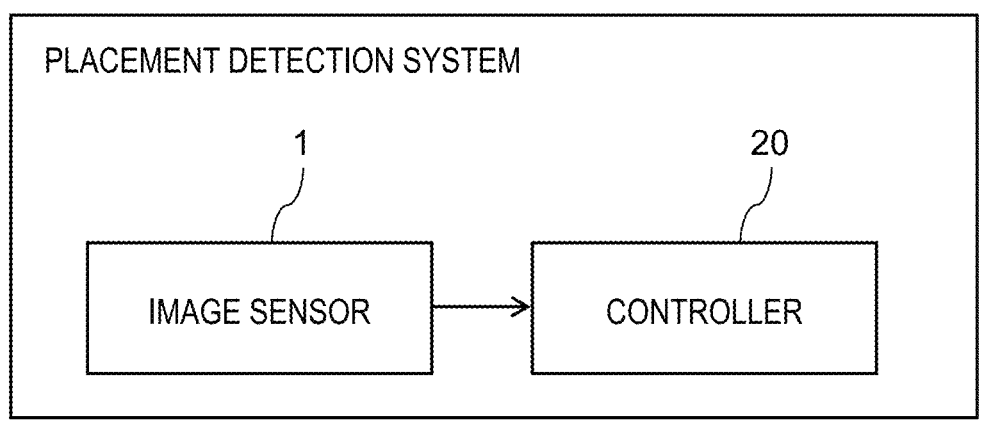
FIG. 1B is a block diagram showing an image sensor and a controller according to the present disclosure.

FIG. 1A is an outer appearance view of an example of a placement detection system according to the present disclosure. FIG. 1B is a block diagram showing an image sensor and a controller according to the present disclosure.

The placement detection system has image sensor 1, placement table 3, and controller 20. Here, image sensor 1 is an example of an imaging device that images passport 2 (an example of an object) placed in placement region 4 (see FIG. 3) on placement table 3 through the placement table 3 to generate an input image. Controller 20 is an example of a control device that receives the input image. Here, placement region 4 has long sides longer than long sides of passport 2 that is double-page spread. Placement region 4 has short sides longer than short sides of passport 2 that is double-page spread.

Placement table 3 is a transparent glass plate, for example. Passport 2 is placed on placement table 3. Image sensor 1 images a glass surface of placement table 3, that is, placement region 4 from below placement table 3. Image sensor 1 is a complementary metal oxide semiconductor (CMOS) image sensor, a charge coupled device (CCD) image sensor, or the like, for example.

The input image generated by image sensor 1 is sent to controller 20. Controller 20 determines whether the target object is placed on placement table 3 by using the input image. Controller 20 is formed by a central processing unit (CPU), memories (a read-only memory (ROM), random-access memory (RAM)), and the like. Functions of controller 20 described below are implemented by the CPU of controller 20 by running a program stored in the memories of controller 20, for example.

Figure 2:
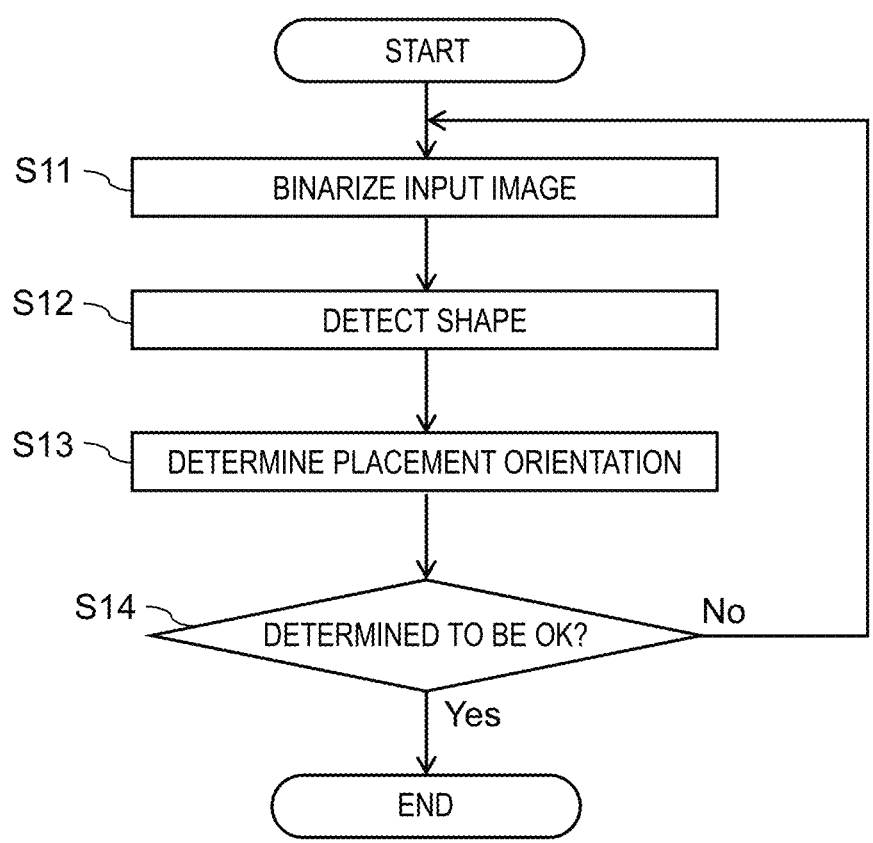
FIG. 2 is an operation flowchart of the placement detection system.

FIG. 2 is an operation flowchart of the placement detection system.

First, controller 20 binarizes the input image from image sensor 1 and generates an image that is binarized (binarized image) (S11).

Next, controller 20 detects a shape of passport 2 by using the binarized image (S12).

Based on a detection result in S12, controller 20 determines whether passport 2 is placed in a predetermined placement orientation (S13). If a determination result is "Yes", passport 2 is regarded as being placed in the target placement orientation and placement detection processing is ended. If the determination result is "No", the processing returns to a start of the operation flowchart to repeat the placement detection (S14).

Figure 3:
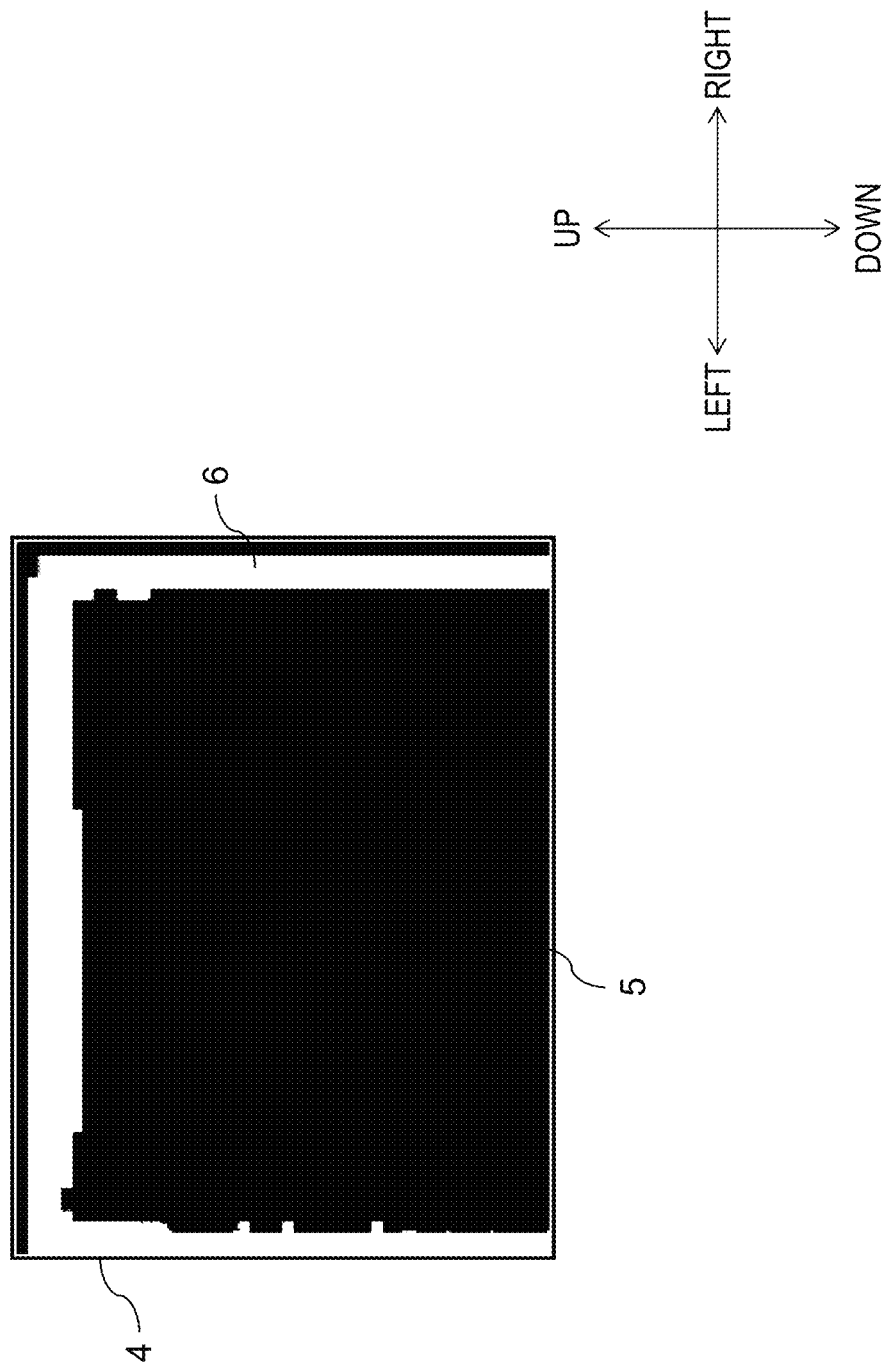
FIG. 3 is an explanatory view of an example of a binarized image of a passport that is placed in a landscape orientation.

FIG. 3 is an explanatory view of an example of the binarized image of passport 2 that is placed in the landscape orientation and shows the example of the image after binarization processing in S11 in FIG. 2.

In the binarization processing, pixels having pixel levels lower than or equal to the predetermined threshold value are expressed as black pixels and pixels having pixel levels higher than the predetermined threshold value are expressed as white pixels. In the binarized image, passport 2 placed on placement table 3 has low pixel levels and therefore passport region 5 is expressed with the black pixels. Background region 6 not covered with passport 2 has high pixel levels and therefore background region 6 is expressed with the white pixels. The pixel levels of the respective pixels of the input image range from 0 to 255, for example. If the predetermined threshold value is 40, the pixels having the pixel levels lower than or equal to 40 are the black pixels and the pixels having the pixel levels higher than 40 are the white pixels in the binarization processing. Here, the pixel level refers to a value indicating brightness of each of the pixels of the input image.

FIG. 4 is an explanatory view of an example of a method of detecting passport 2 that is placed in a landscape orientation. With reference to FIG. 4, operations in S12 and S13 in FIG. 2 are described.

In placement region 4, controller 20 detects the shape of passport 2 while moving passport detection frame 7 for detecting a state of landscape-oriented placement of passport 2. To put it concretely, controller 20 detects a place of the binarized image a high proportion of which is occupied by the black pixels in passport detection frame 7. Controller 20 determines whether the proportion of the detected position occupied by the black pixels is higher than or equal to a predetermined proportion. This way, controller 20 determines the placement orientation of passport 2. Here, the predetermined proportion is 90%, for example. At this time, controller 20 determines that passport 2 is placed in the landscape orientation in placement region 4 if the proportion of an inside of passport detection frame 7 occupied by the black pixels is 90% or higher.

[1-1. Problem Caused by Outside Light]

Figure 5:
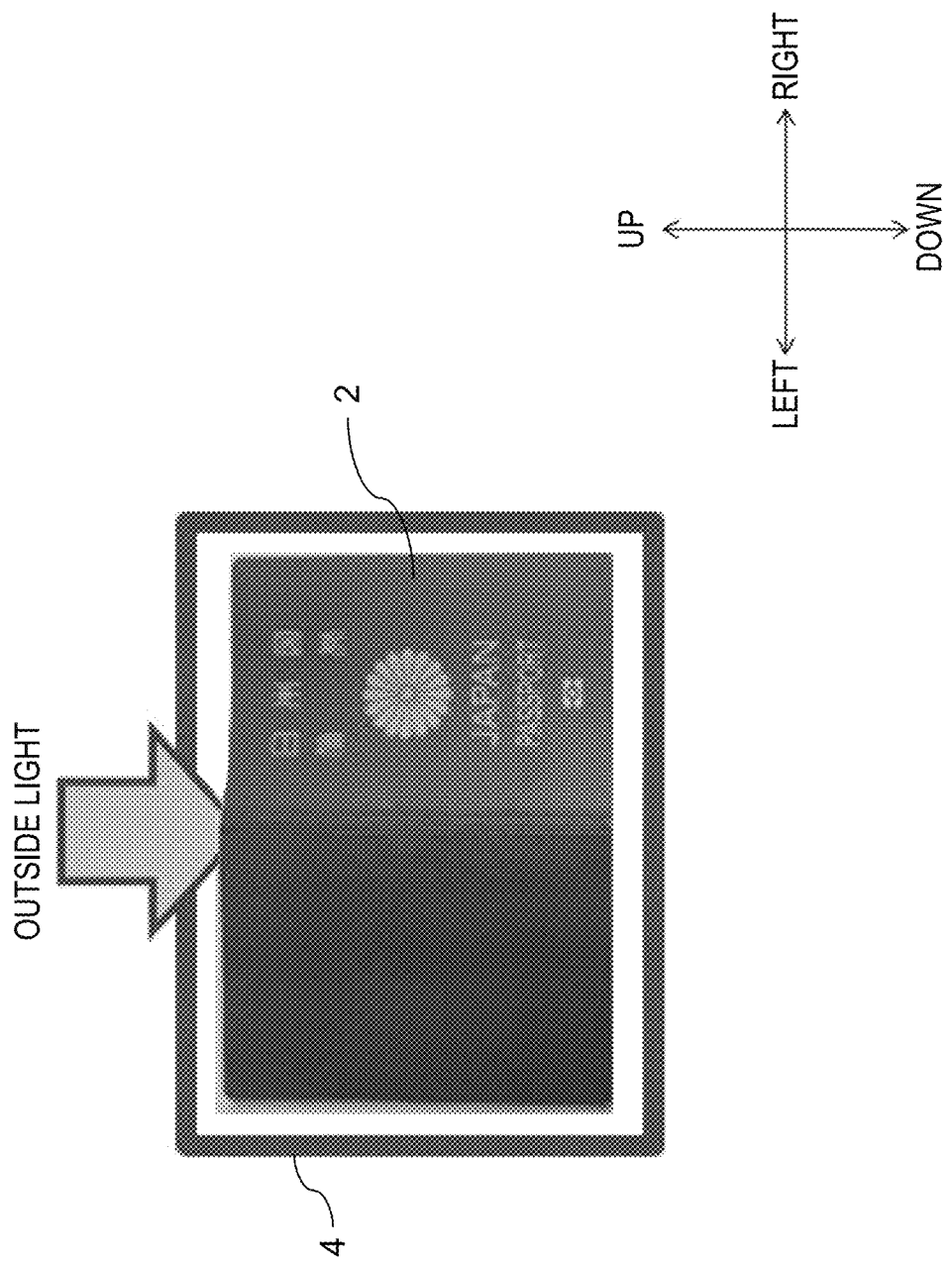
FIG. 5 is an explanatory view of the passport with a binding part lifting.

FIG. 5 is an explanatory view of the passport with a binding part lifting.

In FIG. 5, the binding part of passport 2 placed in placement region 4 is lifting. Therefore, FIG. 5 shows that the outside light comes in from the lifting part. Here, the outside light refers to sunlight, a light disposed in a room, and the like, for example.

FIG. 6 shows an input image of passport with the binding part lifting generated by image sensor 1.

In the input image of passport 2 placed in placement region 4, passport region 5 is expressed with low pixel levels. The outside light comes in from an upper central portion of passport region 5 to raise the pixel levels around the upper center of passport region 5.

FIG. 7 shows is a binarized image of the passport with the binding part lifting.

Pixels having pixel levels lower than or equal to the predetermined threshold value are expressed as black pixels and pixels other than the black pixels are expressed as white pixels. The region having the pixel levels raised by the outside light coming in from the upper central portion of passport region 5 is expressed with the white pixels. As a result, passport region 5 expressed with the black pixels is trimmed. If the shape detection and the placement orientation determination described with reference to FIG. 4 are performed for this binarized image, it is determined that passport 2 is not placed, though passport 2 is placed.

[1-2. Operation]

Figure 8:
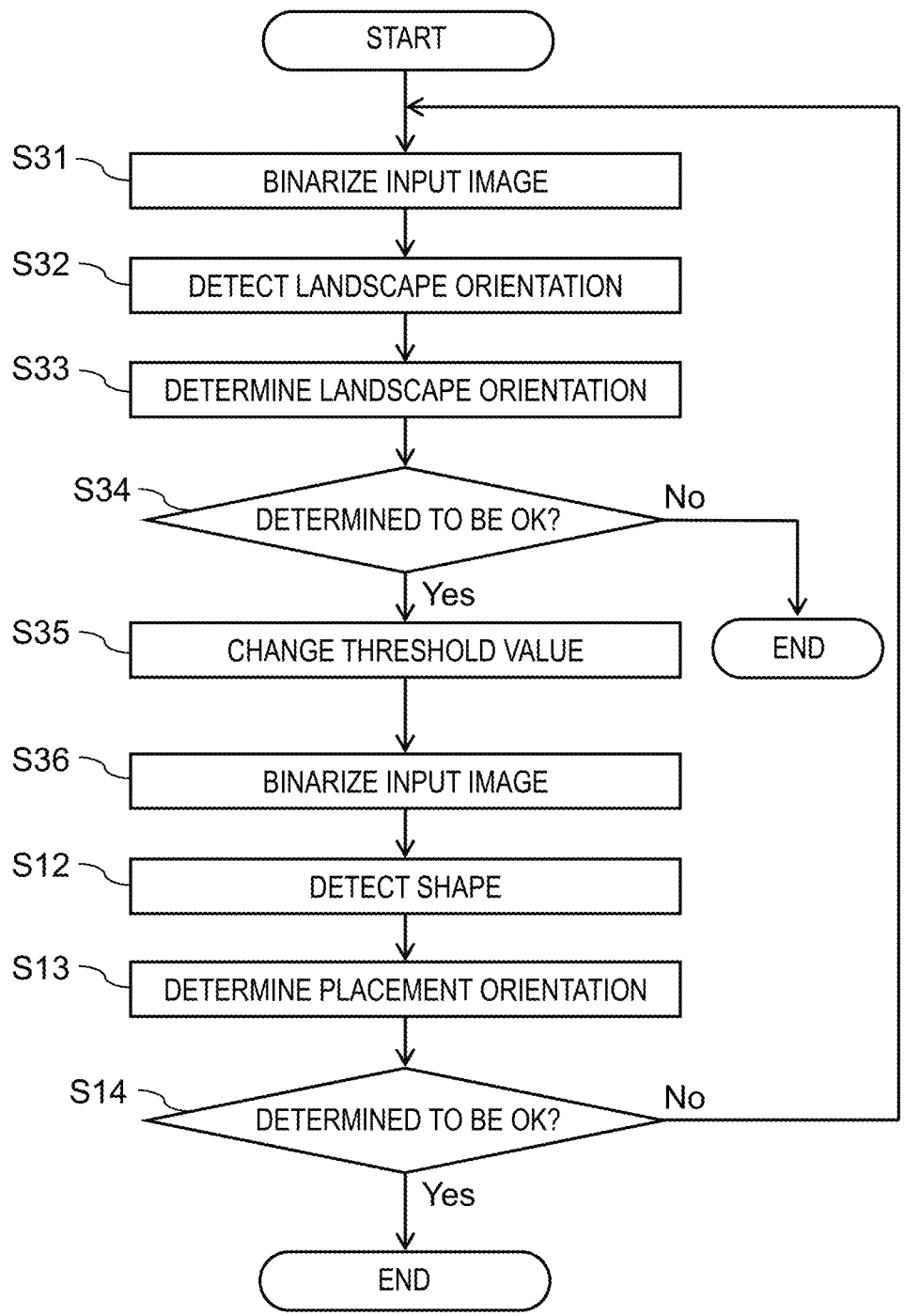
FIG. 8 is an operation flowchart of a placement detection system including processing for coping with lifting of the binding part.

FIG. 8 is an operation flowchart of a placement detection system including processing for coping with the lifting of the binding part.

First, controller 20 receives the input image generated by image sensor 1. Controller 20 performs first binarization processing for the input image based on a first threshold value to generate a first binarized image (S31). In the present exemplary embodiment, the image shown in FIG. 7 is an example of the first binarized image. As described later, the first threshold value is 40, for example.

Next, based on the binarized image obtained by the binarization, controller 20 detects a state of a region having low pixel levels (lower than the threshold value, for example) in a predetermined width of a central portion in a vertical direction (S32).

Figure 9:
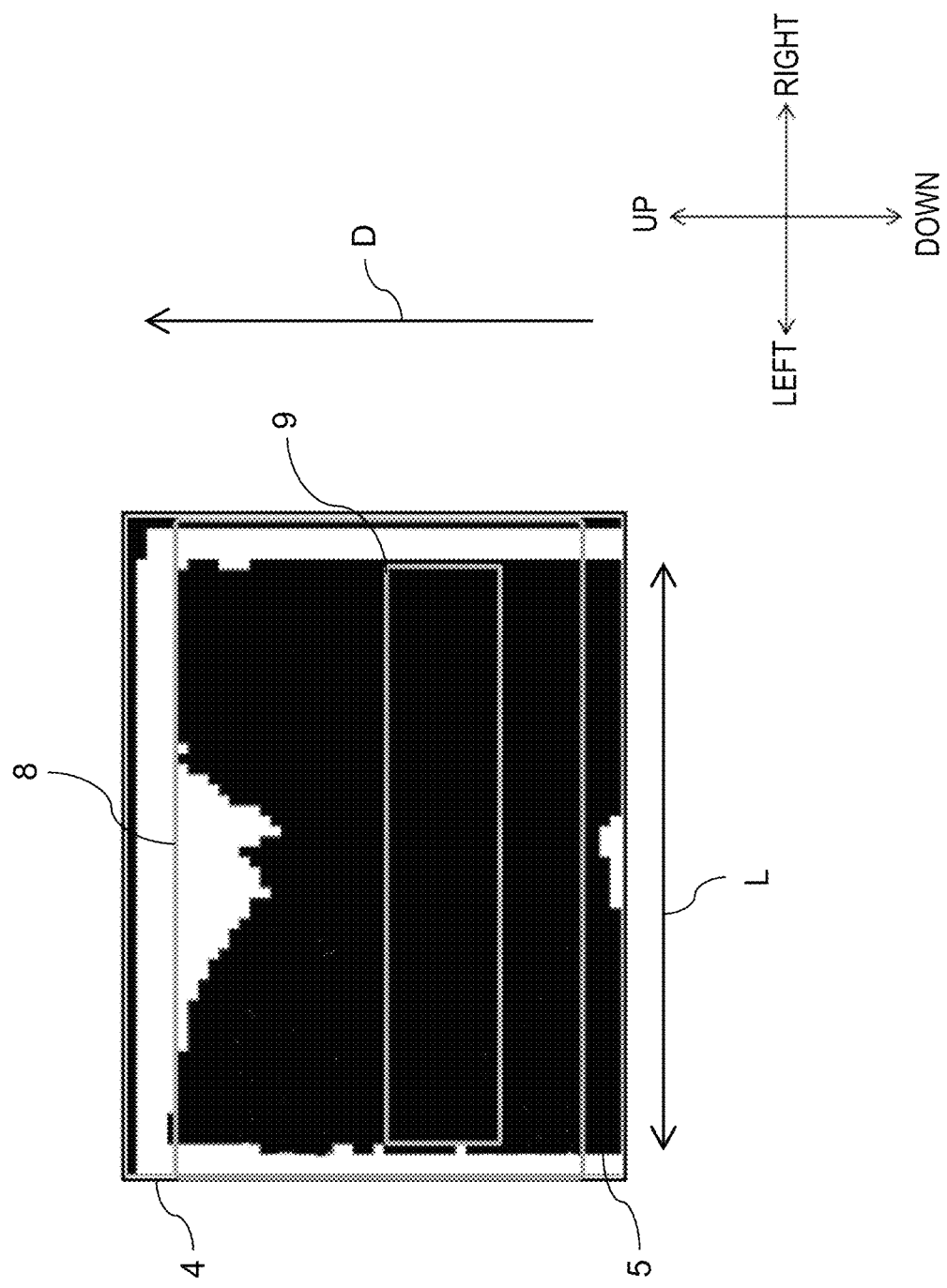
FIG. 9 is an explanatory view of an example of a region for detecting the landscape orientation.

With reference to FIG. 9, details of step S32 are described. FIG. 9 is an explanatory view of an example of a region for detecting the landscape orientation. In the binarized image, passport 2 placed in placement region 4 is expressed with the black pixels as shown by passport region 5 due to the outside light incident from a lifting portion of the binding part. Landscape orientation detection region 8 (an example of a second region) is set with predetermined height and width at the central portion of the binarized image. For example, the height of landscape orientation detection region 8 is 80% of a height of placement region 4. Landscape orientation detection region 8 is positioned at a central portion in a vertical direction of placement region 4. The width of landscape orientation detection region 8 is equal to a width of placement region 4. Landscape orientation detection region 8 may be equal to placement region 4 in size. Controller 20 detects a state of landscape orientation detection region 8.

Next, based on the detected state of landscape orientation detection region 8, controller 20 determines whether passport 2 is placed in the landscape orientation (S33). Here, the landscape orientation is an example of the predetermined placement orientation.

With reference to FIG. 9, details of step S33 are described. Controller 20 determines that passport 2 is placed in the landscape orientation when a plurality of lines of black pixels having lengths L corresponding to the long side of passport 2 (a width of passport 2) are arranged successively in landscape orientation detection region 8 of the binarized image. In the present exemplary embodiment, controller 20 determines that passport 2 is placed in the landscape orientation when ten or more lines of black pixels having lengths L are arranged successively along short-side direction D.

Alternatively, controller 20 may determine that passport 2 is placed in the landscape orientation when the number of black pixels in landscape orientation determination region 9 (an example of a third region) of the binarized image makes up a predetermined or higher proportion of the number of pixels in landscape orientation determination region 9. Here, the black pixels refer to the pixels having the pixel levels lower than or equal to the first threshold value. Here, the predetermined proportion is 90%, for example. A width of landscape orientation determination region 9 is 90% of the width of passport 2 that is double-page spread, for example. A height of landscape orientation determination region 9 is 30% of a height of passport 2 that is double-page spread, for example.

Controller 20 may determine that passport 2 is placed in the landscape orientation when passport 2 is placed on placement table 3 such that the long sides of passport 2 and the long sides of placement region 4 are substantially parallel.

If it is determined that passport 2 is highly likely to be placed in the landscape orientation, the processing goes to step S35. On the other hand, if it is determined that passport 2 is unlikely to be placed in the landscape orientation, the placement detection processing is ended (S34).

Controller 20 changes the threshold value and produces a threshold value table in a predetermined width at a central portion in a horizontal direction (S35).

Figure 10:
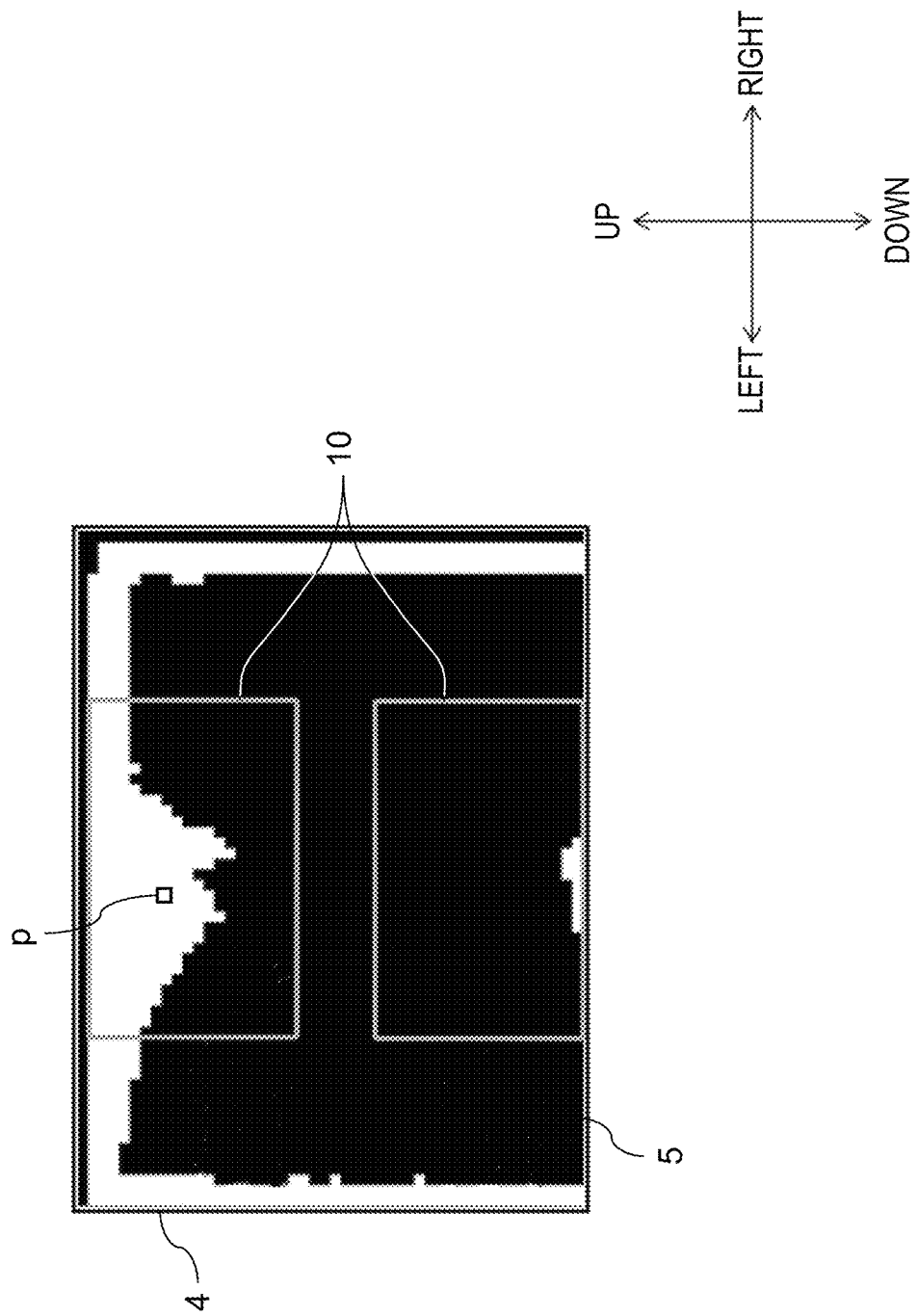
FIG. 10 is an explanatory view of an example of regions where a threshold value is changed.

With reference to FIG. 10, details of step S35 are described. FIG. 10 is an explanatory view of an example of regions where the threshold value is changed. Passport 2 placed in placement region 4 is expressed with the black pixels as shown by passport region 5. Threshold value changing regions 10 (examples of first regions) are set with predetermined widths at upper and lower portions of the horizontal central portion of the binarized image. In other words, threshold value changing regions 10 are set in portions of a central portion in a long-side direction of placement region 4 excluding a central portion in the short-side direction of placement region 4. This is because the outside light is expected to be incident from an up-down direction in the lifting state of passport 2.

In each of threshold value changing regions 10 of the input image, controller 20 identifies target pixel p that is a pixel sandwiched between black pixels (pixels having pixel levels lower than or equal to the first threshold value) in threshold value changing region 10 and is a white pixel (a pixel having a pixel level higher than the first threshold value). Controller 20 changes the threshold value of target pixel p to the second threshold value higher than the first threshold value. Controller 20 changes the threshold value of each of the white pixels other than target pixel p sandwiched between the black pixels to the second threshold value. In this manner, controller 20 produces the threshold value table where target pixel p and the second threshold value of target pixel p correspond to each other. Here, in the present exemplary embodiment, if the pixel levels of the respective pixels of the input image range from 0 to 255, the first threshold value is 40, for example, and the second threshold value is 150, for example.

For example, a height of each of threshold value changing regions 10 is 40% of the height of placement region 4. For example, a width of each of threshold value changing regions 10 is 60% of the width of placement region 4. A horizontal position of each of threshold value changing regions 10 is a horizontal center of placement region 4. The height and the width of each of threshold value changing regions 10 may be determined depending on a size of the object to be placed and an expected state of an influence of the outside light. Not two threshold value changing regions 10 but only one threshold value changing region 10 may be set. In this case, a height of threshold value changing region 10 may be equal to the height of placement region 4.

Next, controller 20 binarizes the input image by using the produced threshold value table (S36). In other words, controller 20 performs second binarization processing for target pixel p based on the second threshold value to generate a second binarized image. At this time, controller 20 generates the second binarized image by using the threshold value table.

Figure 11:
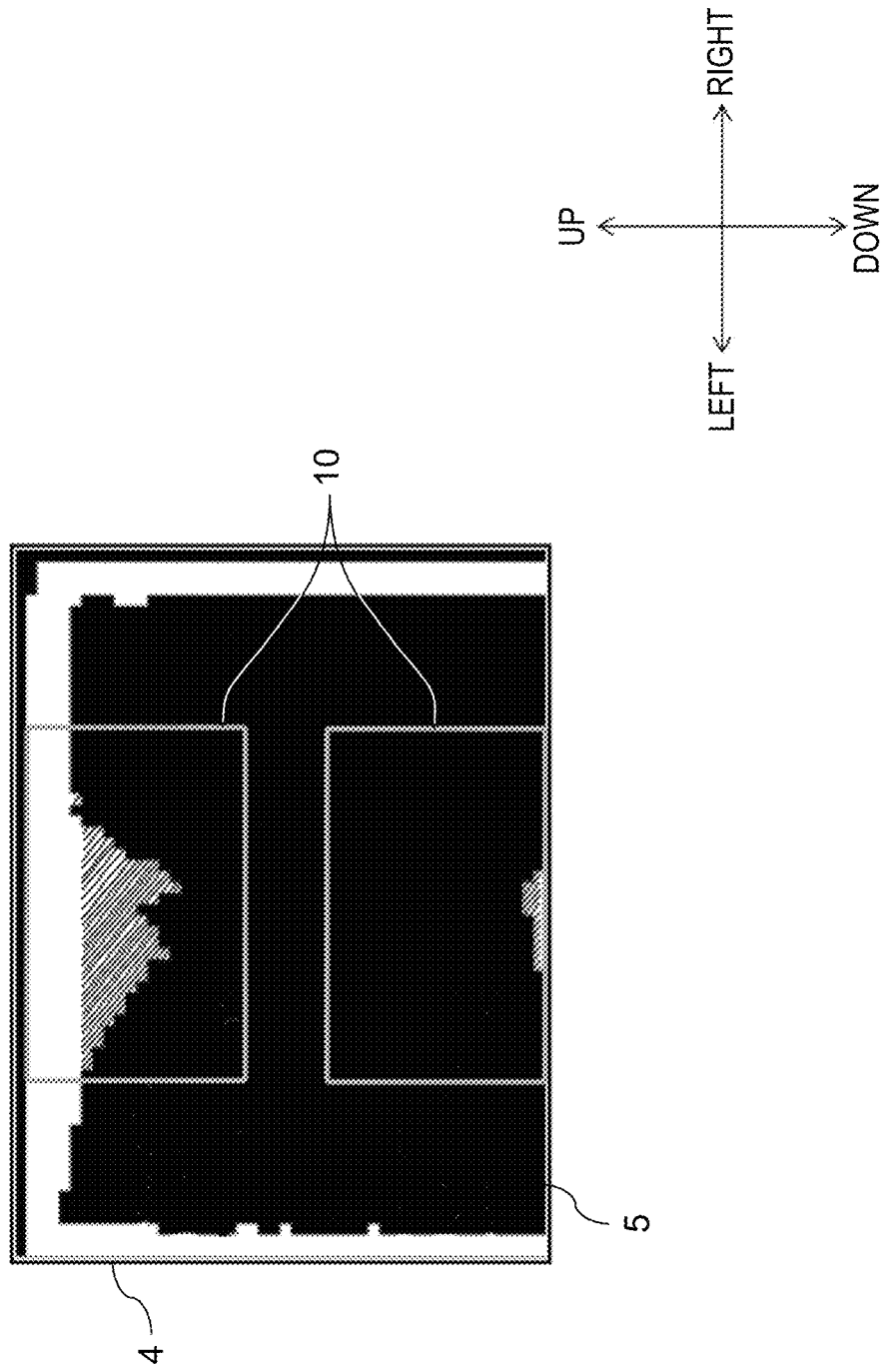
FIG. 11 is an explanatory view of an example of regions for which high threshold values are set as a result of change of threshold values.

With reference to FIGS. 11 and 12, step S36 is further described. FIG. 11 is an explanatory view of regions for which high threshold values are set as a result of change of the threshold values. FIG. 12 shows a binarized image after the processing for coping with the lifting of the binding part, which is an example of the image after the binarization processing in S36 in FIG. 8. The image shown in FIG. 12 is the example of the second binarized image.

The regions for which the high threshold values are set in the threshold value table described in step S35 correspond to portions shown with hatch lines (see FIG. 11). Here, when passport 2 is placed obliquely with respect to placement region 4 (not shown), regions where passport 2 is not present are not sandwiched with black pixels. Therefore, threshold values for the regions where passport 2 is not present are not changed to higher threshold values.

The image in FIG. 12 shows an improvement over the image in FIG. 7 where passport region 5 is trimmed. This is because the pixels having the pixel levels raised by the outside light incident from the lifting binding part of passport 2 are binarized by use of the high threshold values. This way, it is possible to detect that passport 2 is placed in placement region 4 by suppressing the influence of the outside light.

Controller 20 detects the shape of passport 2 in the binarized image (S12). In other words, controller 20 detects the shape of passport 2 based on the second binarized image.

Based on a result obtained in the shape detection, controller 20 determines whether passport 2 is placed in the predetermined placement orientation (S13).

If a determination result is "Yes", passport 2 is regarded as being placed in the predetermined placement orientation and placement detection processing is ended. If the determination result is "No", the processing returns to a start of the operation flowchart to repeat the placement detection (S14).

[1-3. Effects and Others]

As described above, in the present exemplary embodiment, even if passport 2 with the binding part of passport 2 lifting is placed in placement region 4, it is possible to detect placed passport 2. As a result, it is unnecessary to slip passport 2 or the like under a cover, hold down passport 2, or hold down passport 2 with a lid. Therefore, it is possible to detect the shape of the object by only placing the object in placement region 4 without the cover. Therefore, it is possible to provide the system that can be easily used by a user.

The above-described exemplary embodiment exemplifies a technique of the present disclosure. Therefore, the exemplary embodiment may be variously modified within a scope of the claims or a scope of equivalents of the claims. Alternatively, one or some components of the exemplary embodiment may be replaced by other component(s), within a scope of the claims or a scope of equivalents of the claims. Alternatively, one or some components may be added to the exemplary embodiment, within a scope of the claims or a scope of equivalents of the claims. Alternatively, one or some components may be eliminated from the exemplary embodiment, within a scope of the claims or a scope of equivalents of the claims.

INDUSTRIAL APPLICABILITY

The present disclosure can be applied to a placement detection system that detects a shape of an object under an influence of an outside light or the like. For example, the present disclosure can be applied to a passport reader that determines whether a placement orientation of a passport is appropriate.

What is claimed is:

1. A placement detection system comprising:
a placement table;
an image sensor that images an object placed in a placement region on the placement table through the placement table to generate an input image; and
a controller that receives the input image,
wherein the controller
performs first binarization processing for the input image based on a first threshold value to generate a first binarized image,
determines whether the object is placed in a predetermined placement orientation based on the first binarized image,
changes a threshold value for a target pixel to a second threshold value higher than the first threshold value when the object is determined to be placed in the predetermined placement orientation, the target pixel being sandwiched between pixels having pixel levels lower than or equal to the first threshold value and has a higher pixel level than the first threshold value in a first region of the input image,
performs second binarization processing for the target pixel based on the second threshold value to generate a second binarized image, and
detects a shape of the object based on the second binarized image.

2. The placement detection system according to claim 1, wherein the controller determines that the object is placed in the predetermined placement orientation when lines of a plurality of black pixels having lengths corresponding to a width of the object are arranged successively in a second region of the first binarized image.

3. The placement detection system according to claim 2, wherein the second region is set with a predetermined height and a predetermined width at a central portion of the first binarized image.

4. The placement detection system according to claim 1, wherein the controller determines that the object is placed in the predetermined placement orientation when a proportion is equal to or higher than a predetermined proportion, the proportion being a number of pixels having pixel levels equal to or lower than the first threshold value in a third region of the first binarized image with respect to a number of pixels in the third region.

5. The placement detection system according to claim 1, wherein the controller produces a threshold value table where the target pixel and the second threshold value correspond to each other and generates the second binarized image by using the threshold value table.

6. The placement detection system according to claim 1, wherein the placement table is a transparent plate.

7. The placement detection system according to claim 1, wherein the placement region has a rectangular shape.

8. The placement detection system according to claim 7, wherein the object has a rectangular shape.

9. The placement detection system according to claim 8, wherein the object is a passport that is double-page spread.

10. The placement detection system according to claim 8, wherein
the placement region has long sides longer than long sides of the object, and
the placement region has short sides longer than short sides of the object.

11. The placement detection system according to claim 10, wherein the controller determines that the object is placed in the predetermined placement orientation when lines of a plurality of black pixels having lengths corresponding to the long sides of the object are arranged successively in a second region of the first binarized image.

12. The placement detection system according to claim 10, wherein the controller determines that the object is placed in the predetermined placement orientation when the object is placed on the placement table with the long sides of the object substantially parallel to the long sides of the placement region.

13. The placement detection system according to claim 10, wherein the first region is set in a portion of a central portion in a long-side direction of the placement region excluding a central portion in a short-side direction of the placement region.

* * * * *